(12) United States Patent
Pulikottil et al.

(10) Patent No.: US 6,855,653 B2
(45) Date of Patent: Feb. 15, 2005

(54) PROCESS FOR PREPARING HYDRO-DESULFURIZATION CATALYST

(75) Inventors: Alex Cheru Pulikottil, Haryana (IN); Manoranjan Santra, Haryana (IN); Hillol Biswas, Haryana (IN); Mani Karthikeyan, Haryana (IN); Dharmendra Kumar Yadav, Haryana (IN); Ram Prakash Verma, Haryana (IN)

(73) Assignee: Indian Oil Corporation Limited, Mumbai (IN)

( * ) Notice: Subject to any disclaimer, the term of this patent is extended or adjusted under 35 U.S.C. 154(b) by 0 days.

(21) Appl. No.: 10/721,078

(22) Filed: Nov. 26, 2003

(65) Prior Publication Data

US 2004/0204309 A1 Oct. 14, 2004

(30) Foreign Application Priority Data

Apr. 10, 2003 (IN) .................................. 357/MUM/2003

(51) Int. Cl.[7] .............................. B01J 29/08; B01J 29/14
(52) U.S. Cl. .............................. 502/66; 502/63; 502/64; 502/74; 502/79; 502/214
(58) Field of Search .............................. 502/60, 63, 64, 502/66, 74, 79, 208, 214, 313, 314, 315

(56) References Cited

U.S. PATENT DOCUMENTS

| | | | |
|---|---|---|---|
| 3,620,964 A | * 11/1971 | Stover et al. ............. | 208/111.3 |
| 3,969,273 A | 7/1976 | Brown et al. ............... | 252/435 |
| 4,500,645 A | 2/1985 | Fuchikami et al. ........... | 502/65 |
| 4,663,023 A | * 5/1987 | McCandlish et al. ....... | 208/112 |
| 4,789,654 A | * 12/1988 | Hirano et al. ................. | 502/66 |
| 5,151,172 A | 9/1992 | Kukes et al. ................ | 208/144 |
| 5,378,671 A | * 1/1995 | Keville et al. ................ | 502/64 |
| 5,609,750 A | 3/1997 | Nat et al. .................... | 208/122 |
| 5,686,374 A | 11/1997 | Nakaoka ..................... | 502/313 |
| 5,897,768 A | 4/1999 | McVicker et al. .......... | 208/215 |
| 5,958,224 A | 9/1999 | Ho et al. ..................... | 208/240 |
| 6,015,485 A | 1/2000 | Shukis et al. ............... | 208/112 |
| 6,200,927 B1 | 3/2001 | Shukis et al. ............... | 502/355 |
| 6,239,054 B1 | 5/2001 | Shukis et al. ................. | 502/29 |
| 2004/0144691 A1 | * 7/2004 | Benard et al. ................ | 208/89 |

OTHER PUBLICATIONS

Mochida et al., "Deep Hydrodesulfurization of diesel fuel: Design of reaction process and catalysts," *Catalysis Today*, vol. 29, pp. 185–189, 1996.

* cited by examiner

*Primary Examiner*—Christina Johnson
(74) *Attorney, Agent, or Firm*—Winston & Strawn LLP

(57) ABSTRACT

A process for the preparation of hydrotreating catalyst which comprises of a Group VIB metal and Group VIII metal on an active composite carrier for the removal of sulfur from gas oil feed stocks, wherein the said carrier comprises of a phosphated alumina and an ultra stable Y zeolite and the metal components mostly reside on the alumina, said process comprising the steps of impregnation of chelated metal complex preferentially on to the alumina component of the composite support and subjecting the composite catalyst to a high-speed ball milling. The catalyst obtained by the process of the present invention consists of the active metals in the nanoparticle range (less than 50 Å) while also retaining the zeolite properties of the composite carrier and the catalyst produces less than 50 ppm sulfur from gas oil feed stocks containing greater than 1 wt % sulfur under typical commercial operating conditions.

34 Claims, No Drawings

PROCESS FOR PREPARING HYDRO-DESULFURIZATION CATALYST

FIELD OF INVENTION

The present invention relates to a process for the preparation of a catalyst for heteroatom removal, particularly hydro-desulfurization of hydrocarbon feeds. More particularly, the present invention relates to a process for preparing a catalyst composition which comprise of a composite carrier having an alumina part and a zeolite part, wherein active metal belonging to group VIB of the periodic table and active metal belonging to Group VIII of the periodic table having particle sizes less than 50 Å are being preferentially supported on the alumina part of the composite carrier. The invention further relates to a process for preparing a catalyst composition having excellent catalytic activity for the enhanced capability towards removal of refractory sulfur species and producing ultra low sulfur product.

BACKGROUND OF THE INVENTION

Due to increasingly stringent sulfur specifications in transportation fuels, removal of sulfur compounds from petroleum feed stocks and products has become very important among the refining processes. Environmental protection agencies worldwide have proposed severe regulations for limiting sulfur content in transportation fuels. In diesel, for example, this has already been reduced to 350–500 ppm in most of the countries and is being brought down to 50 ppm and further down to 10 ppm in some countries.

Desulfurization of diesel streams below 350 ppm involves generally the removal of residual sulfur compounds which are primarily aromatic heterocyclic compounds namely benzothiophene, dibenzothiophene and their alkyl substituted analogues or higher homologues. Amongst these, benzothiophene and dibenzothiophene are relatively easily removable sulfur compounds compared to their derivatives especially mono and di alkyl substituted. These sulfur compounds are refractory in nature and pose difficulties in their removal and is the limiting factor for producing ultra low sulfur diesel. Therefore, there is a need for catalysts having improved properties for effective desulfurization of these refractory sulfur compounds, so that sulfur level of the diesel fuel can be brought down to meet the strictest limit required by environmental regulations with minimum or no increase in catalyst volume and operating severity.

Deep desulfurization of diesel fuels requires the removal of the difficult to remove refractory sulfur species. Mochida et al (Catalyst Today, 29, 185, 1996) illustrates the importance of both the process and catalyst design for handling such refractory sulfur species. The approaches mentioned therein include selective oxidation of the refractory sulfur compounds or selective isomerization and/or cracking of the refractory compounds followed by hydrodesulfurization.

U.S. Pat. No. 5,958,224 discloses that after removal of easy sulfur using conventional hydrodesulfurization catalysts in the first stage, refractory sulfur can be removed by selective oxidation with transition metal oxide as an oxidizing agent. As an instant of this invention, this prior art uses a peroxo metal complexes in the second stage.

Another prior art disclosed in U.S. Pat. No. 5,897,768 for handling refractory sulfur using mixed catalyst bed consisting of conventional hydrotreating catalyst and a zeolite based selective isomerization and cracking catalyst. This is similar in approach with previous art except that after the removal of the non refractory sulfur using conventional hydrodesulfurization catalysts, the product stream containing the unconverted refractory sulfur is to be passed through a "ISOM" unit containing a USY zeolite catalyst where refractory sulfur compounds isomerize and disproportionate to easily removable sulfur compounds. Subsequently, this "ISOM" product is recycled to conventional hydrodesulfurization catalyst bed resulting to low sulfur product.

Various methods of preparation have been made in the art over the years to provide hydrotreating catalysts with improved activity and also for the removal of the most difficult to remove refractory sulfur species. The improvements of activity of hydrotreating catalysts are achieved either by improvement of the support characteristics or by improvement of active metal dispersions or both. This is achieved in the art by modifications of preparation procedures or by the use of additives.

U.S. Pat. Nos. 6,015,485, 6,200,927 and 6,239,054 disclose a method for modification of the support by way of generation of nanocrystalline phase on the alumina support. The method herein involves the modification of alumina carrier by use of chemical treatment, involving the use of chelating agent like EDTA and subsequent aging of the support for considerable period of time producing crystallite size <25 Å on the surface. This is responsible for higher activity catalyst.

Carriers have also been developed with controlled pore size distribution, surface area and surface acidity. This has been achieved in the art by the use of various additives and modification of preparation procedures. U.S. Pat. No. 3,969,273 discloses the use of 1–10% phosphate in calcined alumina support before the catalytically active metal is impregnated to achieve higher surface area and macro porosity. U.S. Pat. No. 3,969,273 discloses a method for preparation of phosphated alumina extrudates that can be used as support for hydrotreating catalyst preparation, the patent describes that the mulling of alumina powder with water soluble phosphate compound followed by extrusion generating supports with higher surface area and porosity.

U.S. Pat. No. 5,609,750 discloses a hydrotreating catalysts whose support constitutes of alumina, silica alumina and boron, the active metal are impregnated on to this modified support. The boron and silica-alumina is claimed to generate controlled acidity, which is responsible for some cracking activity of the catalyst. U.S. Pat. Nos. 5,151,172, 4,500,645, JP-V-2-39305 discloses the use of zeolites along with alumina support for generating acidity to the support. In all these patents the zeolites along with the alumina is extruded and then loaded with the active metal components.

Even though the above cited references show a continuous refinement and modification of methods to achieve a high active deep desulfurization catalyst from the point of view of support types, support structures, active metal components and their dispersion and loading, there is continuing need for better methods/procedures to achieve an optimum effect of all these parameters for preparation of higher active catalysts.

The present invention provides a high active hydrotreating catalyst by a process that results in well dispersed metal components in nanocrystalline range along with an acidic property of the support for effective removal of refractory sulfur compounds.

SUMMARY OF INVENTION

Accordingly, the present invention provides a process for preparing a hydrotreating catalyst composition which comprise of a composite carrier having an alumina part and a zeolite part wherein active metal belonging to group VIB of the periodic table and active metal belonging to Group VIII of the periodic table having particle size less than 50 Å are being preferentially supported on the alumina part of the composite carrier, and useful for desulfurization of gasoils.

DETAILED DESCRIPTION OF THE PREFERRED EMBODIMENTS

The present invention provides a process for preparing a hydrotreating catalyst composition useful for desulfurization of gasoils. Another benefit that can be achieved according to the present invention is a process for preparing a hydrotreating catalyst composition which comprise of a composite carrier having an alumina part and a zeolite part wherein active metal belonging to group VIB of the periodic table and active metal belonging to Group VIII of the periodic table having particle sizes less than 50 Å are being preferentially supported on the alumina part of the composite carrier.

The present invention describes a process for preparing a hydrotreating catalyst composition, for the removal of sulfur from various petroleum feedstocks, more preferably for deep desulfurization of gasoils. The present invention more particularly, provides a process for preparing a hydrotreating catalyst having highly dispersed active metal component in the nanoparticles range (<50 Å) and having built-in selective cracking/isomerization function for the removal of refractory sulfur compounds from the gasoils.

The present invention provides a process for preparing a hydrotreating catalyst composition which comprise of a composite carrier having an alumina part and a zeolite part wherein active metal belonging to group VIB of the periodic table and active metal belonging to Group VIII of the periodic table having particle size less than 50 Å are being preferentially supported on the alumina part of the composite carrier and useful for desulfurization of gasoils, said process comprising the steps of:

(a) impregnating a chelated metal solution containing at least one group VIB and at least one group VIII metal on to an alumina support, optionally in presence of a complexing agent;

(b) flash drying the metal impregnated alumina support of step (a);

(c) ball milling the flash dried metal-impregnated alumina support of step (b);

(d) mixing the ball-milled metal-impregnated alumina support of step (c) with USY zeolite in the weight range of 1–10%;

(e) ball milling the mixture of step (d);

(f) adding to the ball milled mixture of step (e) a phosphorus source in the weight range of 0.1 to 5%;

(g) aging the mixture of step (f) for a time period ranging between 1 to 5 hours, and (h) molding/forming, drying and calcining the mixture of step (f) to obtain the hydrotreating catalyst composition.

In an embodiment of the present invention, the metal solution is an aqueous solution of corresponding soluble metal salt.

In another embodiment of the present invention, the group VIB metal is molybdenum.

In yet another embodiment of the present invention, the group VIII metal is selected from cobalt and nickel.

In still another embodiment of the present invention, the group VIII metal is cobalt.

In one more embodiment of the present invention, impregnation of the chelated metal solution on to the alumina support is done by incipient wetness method.

In one another embodiment of the present invention, the alumina used in step (a) has the following characteristics:

| | |
|---|---|
| $Al_2O_3$ | 74 wt % |
| $Na_2O$ | 0.002 wt % |
| Surface Area (BET) | 250 $m^2/g$ |
| Pore Volume | 0.50 ml/g |

In a further embodiment of the present invention wherein in step (a), a complexing agent is added with the metal solution for better dispersion of the metal components.

In an embodiment of the present invention, the complexing agent is soduim salt of EDTA.

In another embodiment of the present invention wherein in step (b), the metal impregnated alumina support is flash dried by heating at a temperature ranging between 40° to 200° C.

In yet another embodiment of the present invention, the metal impregnated alumina support is flash dried by heating at a temperature ranging between 80° to 150° C.

In still embodiment of the present invention wherein in step (c), the flash dried metal-impregnated alumina support is ball milled for a time period ranging between 10 minutes to 1 hour.

In one more embodiment of the present invention, the flash dried metal-impregnated alumina support is ball milled for 30 minutes.

In one another embodiment of the present invention wherein in step (d), the Unit Cell Size (UCS) of the USY zeolite used is in the range of 24.25 to 24.45 Å.

In a further embodiment of the present invention, the (UCS) of the USY zeolite is 24.35 Å.

In an embodiment of the present invention wherein in step (d), the weight percentage of USY zeolite used is in the range of 1 to 5.

In another embodiment of the present invention wherein in step (e), the mixture of ball-milled metal-impregnated alumina support and USY zeolite is ball milled for a time period ranging between 10 minutes to 2 hours.

In yet another embodiment of the present invention, the mixture of ball-milled metal-impregnated alumina support and USY zeolite is ball milled for a time period ranging between 10 minutes to 1 hour.

In still another embodiment of the present invention wherein in step (f), the phosphorus source is di-ammonium hydrogen phosphate.

In one more embodiment of the present invention, di-ammonium hydrogen phosphate used is in the weight range of 0.1 to 2% by total weight of $P_2O_5$.

In one another embodiment of the present invention wherein in step (g), the mixture is aged for a time period ranging between 1 to 2 hours.

In a further embodiment of the present invention wherein in step (h), molding is done by extrusion or granulation.

In an embodiment of the present invention, the mixture is molded in the form of cylinders, granules or tablets.

In another embodiment of the present invention, the diameter of the extrudate is preferably in the range of 0.5 to 3.0 mm.

In yet another embodiment of the present invention, the extrudate is dried at a temperature ranging between ambient temperature and 150° C.

In still another embodiment of the present invention, the dried extrudate is calcined at a temperature ranging between 250° to 800° C.

In one more embodiment of the present invention, the dried extrudate is calcined at a temperature ranging between 250° to 600° C.

In one another embodiment of the present invention wherein in step (h), the hydrotreating catalyst thus obtained has the following composition:

| Ingredient | Weight % |
| --- | --- |
| CoO | 3.841 |
| MoO$_3$ | 20.154 |
| Na$_2$O | 0.002 |
| P$_2$O$_5$ | 0.094 |
| Al$_2$O$_3$ | 71.947 |
| USY | 3.962 |

In another embodiment of the present invention wherein in step (h), the hydrotreating catalyst thus obtained has the following characteristics:

| | |
| --- | --- |
| UCS (Å) | 24.28 |
| Total SA, m$^2$/g | Greater than 260 |
| Pore Volume, cc/gm | 0.25 to 0.45 |
| Metal cluster size (Å) | Less than 50 |

In yet another embodiment of the present invention wherein in step (h), the hydrotreating catalyst thus obtained has the following characteristics:

| | |
| --- | --- |
| UCS (Å) | 24.28 |
| Total SA, m$^2$/g | 279 |
| Pore Volume, cc/gm | 0.29 |
| Metal cluster size (Å) | Less than 50 |

In still another embodiment of the present invention, the metal is preferentially loaded on the alumina support and the zeolite is substantially free from the metal.

In one more embodiment of the present invention, the hydrotreating catalyst removes refractory sulfur species from gasoils.

In a further embodiment of the present invention, the hydrotreating catalyst produces gasoil having less than 50-ppm sulfur from a gasoil feedstock having about 1 wt % sulfur content under commercial operating conditions.

The hydrotreating catalysts prepared in accordance with the process of the present invention comprises of 10–20% of a Group VIB metal (Mo) and 1–5% of a Group VIII metal (Co or Ni) supported on a composite carrier consisting of phosphated alumina and 1–10% of Y zeolite having a unit cell size of 24.25 to 24.45 Å. The active metal component is preferentially loaded on to the alumina and the zeolite component of the composite carrier is mostly free of the metals, thereby retaining the selective cracking/isomerization function. This is achieved by the impregnation of chelated metal solution comprising of a Group VIB metal (Mo) and Group VIII metals (Co or Ni) by incipient wetness method on to an alumina support followed flash drying at 100–150° C. This dried material is mixed with a modified ultra stable Y zeolite and ball milled using a high-speed planetary ball mill, followed by addition of diammonium hydrogen phosphate and subsequent high-speed ball milling. This composite is then extruded, dried and calcined.

The inclusion of high-speed ball-milling step described in the invention aids in homogenization and also in the subsequent generation of highly dispersed active metal in nanocrystalline range. The addition of diammonium hydrogenphosphate to the metal containing composite carrier as described in present investigation serves to tune the acidic property and stability of the zeolite and the surface properties & porosity of the alumina.

The catalyst prepared according to the current invention have a surface area of at least 260 m$^2$/g and pore volume of 0.35–0.45 cc/g and is found to reduce sulfur from gas oil containing about 1 wt % sulfur to less than 50 ppm under commercial operating conditions employing refinery feedstock.

Base material suitable for preparing the catalyst used in this process of invention are commercially available alumina (Al$_2$O$_3$: 74 wt %, Na$_2$O: 0.002 wt %) having Surface area (BET): 250 m$^2$/g and Pore volume: 0.50 ml/g.

Alternatively the alumina base materials are prepared using cogelation or coprecipitation techniques.

Crystalline USY zeolite as referred to in the present invention is prepared from commercial NaY zeolite having a Si/Al molar ratio 3 to 6 and Na$_2$O content 10.2 wt %. In the present invention this Y type zeolite is first subjected to dealkalation to reduce its alkali content to 0.5% w or less.

The dealkalation is carried out for example as follows: Y type zeolite is treated with an aqueous solution containing ammonium sulfate to exchange the alkali (Na) metal for an ammonium ion followed by drying. The ion exchange and subsequent drying are repeated several times to prepare NH$_4$Y zeolite with its Na content or alkali metal content reduced to 0.5% by weight from 10.2% by weight in NaY.

The dried NH$_4$Y powder containing about 0.5% by weight alkali content is calcined and the exchange procedure as described above is repeated. The exchanged product is dried and calcined followed by repeated exchange with ammonium ion. The alkali removal in this way is reduced to Na$^+$ content to 0.08% w. The temperatures of calcinations used after repeated exchange are in the range of 350° C. to 450° C. with a duration of 2–4 hours. This prepared HY zeolite is then subjected to hydro-thermal treatment between 250° C. and 650° C. followed by subsequent washing with aqueous mineral acid solution to reduce the aluminum content, there by to obtain hydrothermally stable Y zeolite (here in after referred to as USY zeolite). The hydrothermal treatment (steaming) and subsequent acid treatment is performed so that the UCS (Unit Cell Size) of the resulting USY has fallen specifically within range 24.25 to 24.45 Å. The USY zeolite is used in an amount 1 to 20% by weight and more preferably in the range of 1 to 10% by weight.

Alumina as referred to in the present invention is prepared as follows:

Aqueous solutions of aluminum sulfate and ammonium hydroxide are added to hot water at about 40° C. to 80° C. and the resulting solution is adjusted to have pH range about 6.0 to 10 and preferably about 8.0 to 10. The solution is kept at a temperature from ambient to 80° C. for at least 2 hrs during which an aqueous solution of aluminum sulfate and ammonium hydroxide are added. After reaction completion, the gel formed, is aged for 24 hrs and subsequently filtered, washed with ammonical water and dried in an air oven at 110° C.

The process for loading the metals includes impregnation process in which a solution volume just sufficient to fill the pore (wet impregnation) of aluminum hydroxide is used. As stated above, in the present invention the procedure consists of novel two-steps preparation procedure wherein, in the first step aluminum hydroxide is impregnated with aqueous solution of soluble salts of at least one group VIII metal and one group VIB metal along with complexing ligands for better dispersion of the metal components to be introduced into the aluminum hydroxide. The amount and temperature of the impregnation solution are suitably selected so that metals may be supported in the desired amount. The volume of the solution for impregnation would have the desired amount of metals to be incorporated into the final catalyst.

The metal-doped aluminum hydroxide in the first step is dried at temperature 40° C. to 200° C. and more preferable between 80° C. to 105° C. and ball milled for 30 min. This is then mixed with USY zeolite prepared as mentioned above in the range of about 1 to 10% weight and preferably about 1 to 5% by weight and subsequently with di-ammonium hydrogen phosphate in the range 0.1 to 5% by weight and preferably about 0.1 to 2% by weight of total.

The mixture of metal impregnated aluminum hydroxide and USY zeolite is further ball milled using a high speed planetary type ball mill for period of 10 minutes to 2 hours and preferably about 10 minutes to 1 hour and finally mixed with di-ammonium hydrogen phosphate and kept for aging for 1 to 5 hrs and preferably for 1 to 2 hrs.

The aged mixture is extruded and the extrudate material is dried at temperature ranging between ambient temperature and 150° C. and calcined at a temperature range of about 250 to 800° C. and more preferably in the range 250° C. to 600° C.

The form of the catalyst may be cylinders, granules, tablets or any other shapes and these shapes can be obtained by molding process such as extrusion granulation. The diameter of the extrudate is preferably in the range 0.5 to 3.0 mm.

The X-ray diffractogram of the finished catalysts shows amorphous characteristics indicating highly dispersed metal ions, with majority of the metal cluster having size less than 50 Å. The catalyst produced as mentioned above is characterized for the determination of the volume of the pores according to the nitrogen adsorption method as well as measured by the mercury porosimeter. The volume of the pores having diameter in the range of 150 to 15000 Å (as measured by mercury porosimeter) comes about 0.38 ml/g. The pore volume as measured by nitrogen adsorption method is in the range 0.3 to 0.6 ml/g and more preferably between 0.4 to 0.5 ml/g. The BET surface area of the catalyst is in the range 250 to 350 $m^2/g$ and preferably in the range of 230 to 300 $m^2/g$. Further, the final catalyst has the total pore volume in the range of 0.4 to 0.8 ml/g. The nitrogen adsorption and mercury intrusion porosimetery which are used as methods for measuring the pore volume of catalysts are performed in accordance with the methods described in P. M. Emmett et al; catalysis 1,123(1954) (Reinhold publishing co.). Further for nitrogen adsorption, a number of methods are proposed for correcting multilayer adsorption. Among these BJH method [E. P. Barrer, L. G. Joyner and P. P. Halanda, J. Amer. Chem. Soc., 73, 373 (1951)] is generally used.

Description is made of a process for hydrodesulfurization of gas oil by using a catalyst produced according to this invention. Sulfur content in the gas oil is about 5000 ppm to 12000 ppm by weight. The catalyst that is produced according to this invention is presulfided prior to its use. This presulfidation may be performed in-situ, that is, inside a reactor. The calcined catalyst is in the presence of hydrogen containing gas brought into contact with gas oil doped with sulfur compounds e.g. Dimethyl disulfide (DMDS) about 100 to 400 $Nm^3/m^3$ under conditions including a temperature of about 120° C. to 300° C., a pressure (total pressure) of about 10 to 50 bar and a liquid hourly space velocity of about 2 to 4 $h^{-1}$. After this sulfiding treatment, the operation is restarted with sulfur containing diesel feed stock under operation conditions suitable to desulfurization of the feed stock. The preferred reactor for performing hydrodesulfurization is a fixed bed tubular reactor.

The catalyst of the present invention is effective in the removal of refractory sulfur compounds compared to the conventionally prepared catalyst as evidenced from GC-SCD (GC with Sulfur Chemiluminescence Detector) analysis of the products.

In the most common embodiment, each and every number and range of numbers disclosed throughout this Detailed Description should be construed as having the word "about" used therewith even if the word "about" does not specifically appear in front of such number or range of numbers. In a preferred embodiment, the numbers and ranges should be interpreted as not including the word "about."

The term "about," as used herein, should generally be understood to refer to both numbers in a range of numerals. Moreover, all numerical ranges herein should be understood to include each whole integer within the range.

EXAMPLES

This invention will now be described with reference to the following examples which are given by way of illustration and hence, should not be construed to limit the scope of the present invention in any manner.

Example 1

Aluminum sulfate solution was prepared by dissolving 5000 gms aluminum sulfate ($Al_2(SO_4)_3,16H_2O$) in 10 liter water at 60° C. and cooled to 40° C. 200 ml $NH_4OH$ (25% v/v) was diluted with 2000 ml water and warmed to 40° C.

In a vessel 2500 gms of water were added to serve as heel. The pH of the heel was adjusted to pH 8 using few drops 25% v/v ammonia solutions. After the pH of the heel was adjusted to 8.0 as indicated above, the two solutions were added simultaneously with the help of dropping funnels to the vessel with vigorous stirring to maintain a precipitation of pH 8.0–8.5. The precipitate thus obtained was aged for 24 hrs at 40° C. The aged product was filtered and washed using Buchner funnel using 15 lit water. The wet cake was dried in air on a tray for 16 hrs followed by drying in a flash drier at 110–120° C. for 6 hrs and fine to powder.

Example 2

Commercially available sodium Y zeolite having crystallinity 100%, unit cell size 24.69 Å and $Na_2O$ content of 10.2% by weight was subjected to ion exchange by dispersing in hot DM water to remove soluble sodium salts, the filter cake was further dispersed in 5% ammonium sulfate solution with solid and liquid (solution) ratio of 1:10 and heated to reflux temperature while stirring for 1 hour. Filtered the exchanged product hot, washed with DM water thrice. The product was dried at 110° C. for 16 hrs.

The above exchange and the subsequent washing and drying processes were repeated thrice. After this repeated cycle, $Na_2O$ level was brought down to 0.5 wt % from 10.2 wt % in NaY zeolite.

The dried $NH_4Y$ as obtained above, containing about 0.5% weight of $Na^+$ was calcined at 350° C. for 3 hrs. The exchange procedure was again repeated as described above four times but without calcination step. The dried material was calcined at 350° C. for 3 hrs. The same cycle was further repeated as done after first calcination. The Na (as $Na_2O$) content was reduced to 0.08% by weight.

Thus prepared $NH_4Y$ was then subjected to hydrothermal treatment in a steaming furnace at a programmed temperature from 250° C. to 650° C. with an intermitted hold up period of 2 hrs at 500 C and 1 hr at 650° C. respectively with water injection rate 25 ml per hour. The sample was cooled in presence of steam up to 500° C. and subsequently lowered down further without steam. The hydrothermally treated product was then treated with $NH_4Cl$ and refluxed for 30 minutes, filtered and washed till free of chloride ions with DM water and dried at 110° C. for 16 hrs. The X-ray crystallinity of acid extracted product was 86% with UCS 24.28 Å.

Example 3

Aluminum hydroxide prepared as in example 1 was impregnated with a solution consisting of solution 1 and solution 2. Solution 1 was containing 280 g of Ammonium hexamolybdate (SISCO RES LAB, Mumbai, India) dissolved in 400 ml water warm to 60–80° C. To the warm solution 100 ml, Hydrogen peroxide ($H_2O_2$) was added for complete dissolution. To the solution further add 54 gm sodium salt of ethylene di amine tetra acetic acid dissolved in 100 ml water. Solution 2 consists of 169.0 gm cobalt nitrate, hexahydrate dissolved in 40 ml water. The two solutions (1 & 2) was mixed together by pouring solution 1 on 2 with vigorous stirring. Volume of the solution is such that it was just sufficient to fill the pore of the aluminum hydroxide prepared in example 1. The mixture was kept for 30 minutes and further dried in an air oven at 110° C. for 16 hrs.

Example 4

The metal impregnated product as obtained in example 3 was subjected to ball milling for 30 minutes. This was further ball milled with 50 gm Ultra Stable Y zeolite as prepared in example 2 for 10 minutes along with a solution containing 20 gm of di-ammonium hydrogen phosphate in 200 ml water and kept for aging and peptization. This product was extruded using 1/16" die in a laboratory extruder. The extruded product after air drying for 16 hrs was oven dried at 110° C. for 16 hrs and calcined at 450° C. for 3 hrs.

Example 5

A comparative example for preparation of catalyst with same chemical composition as that disclosed in the invention but prepared by conventional method known in the art is described herein. Fine Aluminum hydroxide prepared as in example 1 is then mixed with modified sodium Y zeolite as prepared in example 2. This mixture was then peptized with di-ammonium hydrogen phosphate solution. This product was extruded using 1/16" die in a laboratory extruder. The extruded product is then impregnated with the solution 1 and solution 2 as in example 3. After doping with the metal solutions, the product was oven dried at 110° C. for 16 hrs and calcined at 550° C. for 3 hrs.

Example 6

Catalysts Evaluation: 2 cc of catalysts prepared in example 4 was loaded into a micro reactor and dried in a flow of nitrogen at 175° C. Subsequently, the catalysts was presulfided at 35 bar hydrogen pressure at 350° C. over a period of 22 hrs using a 3% weight Dimethyldisulfide in light gas oil. Operating conditions for the runs at LHSV ($h^{-1}$) 1.3, 2 and 3.0; pressure 39 bar; feed rate (ml/hour) 2.6,4 and 6. Products were collected at different stabilized operating conditions and analyzed for sulfur content after stripping of hydrogen sulfide from the product in a sulfur analyzer (ANTEK, USA) using Pyro UV Fluorescence technique. The same methodology was also adopted for catalyst prepared in example 5. The operating conditions, product property and performance criteria of the catalysts (example 4 and 5) are described in table 1.

TABLE 1

| Desulfurization Activity | | | | |
|---|---|---|---|---|
| OPERATING CONDITIONS | | | PRODUCT 'S' in ppm | |
| Feed rate LHSV ($h^{-1}$) | Temp ° C. | Pressure (bar) | Catalyst (Example 4) | Catalyst (Example 5) |
| 1.0 | 355 | 39 | 48 | 106 |
| 1.5 | 370 | 39 | 42 | 99 |
| 1.5 | 355 | 85 | 45 | 104 |

TABLE 1-continued

| Desulfurization Activity | | | | |
|---|---|---|---|---|
| OPERATING CONDITIONS | | | PRODUCT 'S' in ppm | |
| Feed rate LHSV ($h^{-1}$) | Temp ° C. | Pressure (bar) | Catalyst (Example 4) | Catalyst (Example 5) |
| 1.5 | 370 | 85 | 34 | 88 |
| 2.0 | 370 | 85 | 50 | 110 |

Although preferred embodiments of the invention have been described in the foregoing description, it will be understood that the invention is not limited to the specific embodiments disclosed herein but is capable of numerous modifications by one of ordinary skill in the art. It will be understood that the materials used and the chemical details may be slightly different or modified from the descriptions herein without departing from the methods and compositions disclosed and taught by the present invention.

What is claimed is:

1. A process for preparing a hydrotreating catalyst composition comprising a composite carrier having an alumina part and a zeolite part wherein active metal belonging to group VIB of the periodic table and active metal belonging to Group VIII of the periodic table, each having a particle size less than about 50 Å are being preferentially supported on the alumina part of the composite carrier, and useful for desulfurization of gas oils, said process comprising the steps of:

(a) impregnating a chelated metal solution containing at least one group VIB and at least one group VIII metal on to an alumina support, optionally in presence of a complexing agent;

(b) flash drying the metal impregnated alumina support of step (a);

(c) ball milling the flash dried metal-impregnated alumina support of step (b);

(d) mixing the ball-milled metal-impregnated alumina support of step (c) with USY zeolite;

(e) ball milling the mixture of step (d);

(f) adding to the ball milled mixture of step (e) a phosphorous source;

(g) aging the mixture of step (f) for a time period ranging between about 1 to 5 hours, and (h) molding, drying and calcining the mixture of step (g) to obtain the hydrotreating catalyst composition.

2. A process as claimed in claim 1, wherein the metal solution is an aqueous solution of corresponding soluble metal salt.

3. A process as claimed in claim 1, wherein the group VIB metal is molybdenum.

4. A process as claimed in claim 1, wherein the group VIII metal is selected from cobalt or nickel.

5. A process as claimed in claim 4, wherein the group VIII metal is cobalt.

6. A process as claimed in claim 1, wherein impregnation of the chelated metal solution on to the alumina support is done by incipient wetness method.

7. A process as claimed in claim 1, wherein the alumina used in step (a) has the following characteristics:

| | |
|---|---|
| $Al_2O_3$ | 74 wt % |
| $Na_2O$ | 0.002 wt % |

-continued

| | |
|---|---|
| Surface Area (BET) | 250 m²/g |
| Pore Volume | 0.50 ml/g |

8. A process as claimed in claim 1 wherein in step (a), the complexing agent is sodium salt of EDTA.

9. A process as claimed in claim 1 wherein in step (b), the metal impregnated alumina support is flash dried by heating at a temperature ranging from about 40° to 200° C.

10. A process as claimed in claim 9 wherein, the metal impregnated alumina support is flash dried by heating at a temperature ranging from about 80° to 150° C.

11. A process as claimed in claim 1 wherein in step (c), the flash dried metal-impregnated alumina support is ball milled for a time period ranging from about 10 minutes to 1 hour.

12. A process as claimed in claim 11, wherein the flash dried metal-impregnated alumina support is ball milled for about 30 minutes.

13. A process as claimed in claim 1 wherein in step (d), the Unit Cell Size (UCS) of the USY zeolite used is in the range of about 24.25 to 24.45 Å.

14. A process as claimed in claim 13, wherein the UCS of the USY zeolite is about 24.35 Å.

15. A process as claimed in claim 1 wherein in step (d), the weight percentage of USY zeolite used is in the range of about 1 to 10.

16. A process as claimed in claim 15, wherein the weight percentage of USY zeolite used is in the range of about 1 to 5.

17. A process as claimed in claim 1 wherein in step (e), the mixture of ball-milled metal-impregnated alumina support and USY zeolite is ball milled for a time period ranging from about 10 minutes to 2 hours.

18. A process as claimed in claim 17, wherein the mixture of ball-milled metal-impregnated alumina support and USY zeolite is ball milled for a time period ranging from about 10 minutes to 1 hour.

19. A process as claimed in claim 1 wherein in step (f), the phosphorous source is di-ammonium hydrogen phosphate.

20. A process as claimed in claim 19, wherein di-ammonium hydrogen phosphate used is in the weight range of about 0.1 to 5% by total weight of $P_2O_5$.

21. A process as claimed in claim 20, wherein the di-ammonium hydrogen phosphate used is in the weight range of about 0.1 to 2% by total weight of $P_2O_5$.

22. A process as claimed in claim 1 wherein in step (g), the mixture is aged for a time period ranging from about 1 to 2 hours.

23. A process as claimed in claim 1 wherein in step (h), molding is done by extrusion or granulation.

24. A process as claimed in claim 23, wherein the mixture is molded in the form of cylinders, granules or tablets.

25. A process as claimed in claim 23, wherein the diameter of the extrudate is in the range of about 0.5 mm to 3.0 mm.

26. A process as claimed in claim 23, wherein the extrudate is dried at a temperature ranging between ambient temperature and 150° C. for a time period ranging from about 10 to 30 hours.

27. A process as claimed in claim 26, wherein the dried extrudate is calcined at a temperature ranging from about 250° to 800° C.

28. A process as claimed in claim 27, wherein the dried extrudate is calcined at a temperature ranging from about 250° to 600° C.

29. A process as claimed in claim 1 wherein in step (h), the hydrotreating catalyst thus obtained has the following composition:

| Ingredient | Weight % |
|---|---|
| CoO | 13.841 |
| $MoO_3$ | 20.154 |
| $Na_2O$ | 0.002 |
| $P_2O_5$ | 0.094 |
| $Al_2O_3$ | 71.947 |
| USY | 3.962 |

30. A process as claimed in claim 1 wherein in step (h), the hydrotreating catalyst thus obtained has the following characteristics:

| | |
|---|---|
| UCS (Å) | 24.28 |
| Total SA, m²/g | Greater than 260 |
| Pore Volume, cc/gm | 0.25 to 0.45 |
| Metal cluste size (Å) | Less than 50 |

31. A process as claimed in claim 30, wherein the hydrotreating catalyst thus obtained has the following characteristics:

| | |
|---|---|
| UCS (Å) | 24.28 |
| Total SA, m²/g | 279 |
| Pore Volume, cc/gm | 0.29 |
| Metal cluster size (Å) | Less than 50 |

32. A process as claimed in claim 1, wherein the metal is preferentially loaded on the alumina support and the zeolite is substantially free from the metal.

33. A process as claimed in claim 1, wherein the hydrotreating catalyst removes refractory sulfur species from gas oils.

34. A process as claimed in claim 1, wherein the hydrotreating catalyst produces gas oil having less than about 50-ppm sulfur from a gas oil feedstock having about 1 wt % sulfur content under commercial operating conditions.

* * * * *

UNITED STATES PATENT AND TRADEMARK OFFICE
CERTIFICATE OF CORRECTION

PATENT NO.    : 6,855,653 B2
DATED         : February 15, 2005
INVENTOR(S)   : Pulikottil et al.

It is certified that error appears in the above-identified patent and that said Letters Patent is hereby corrected as shown below:

Column 12,
Line 16, in the first line of the table after the heading, after "CoO", delete "13.841" and insert -- 3.841 --.
Line 31, in the last line of the table, after "Metal", delete "cluste" and insert -- cluster --.

Signed and Sealed this

Tenth Day of May, 2005

JON W. DUDAS
*Director of the United States Patent and Trademark Office*